United States Patent
Fritz et al.

(10) Patent No.: US 7,738,923 B2
(45) Date of Patent: Jun. 15, 2010

(54) METHOD FOR SELECTING A PROCESSING DEVICE

(75) Inventors: Hubert Fritz, Filderstadt (DE); Patrick Blanc, Issy les Moulineaux (FR)

(73) Assignee: Alcatel Lucent, Paris (FR)

( * ) Notice: Subject to any disclaimer, the term of this patent is extended or adjusted under 35 U.S.C. 154(b) by 761 days.

(21) Appl. No.: 11/640,936

(22) Filed: Dec. 19, 2006

(65) Prior Publication Data

US 2007/0165570 A1 Jul. 19, 2007

(30) Foreign Application Priority Data

Jan. 13, 2006 (EP) .................................. 06290099

(51) Int. Cl.
- *H04M 3/00* (2006.01)
- *H04W 72/00* (2009.01)
- *H04B 7/00* (2006.01)
- *H04B 1/38* (2006.01)
- *H04B 7/212* (2006.01)

(52) U.S. Cl. ................. 455/561; 455/418; 455/453; 455/507; 370/348

(58) Field of Classification Search .............. 455/67.13, 455/403, 418, 101, 188.1, 234.2, 335–338, 455/450, 452.1–452.2, 453, 464, 500–510, 455/517, 550–550.1, 552.1, 553.1, 554.2, 455/555, 557–558, 67.16, 68, 179.1, 416, 455/420, 423–424, 522, 561, 562.1, 702–703; 370/322, 328–329, 341, 348, 443, 230, 235, 370/252–253, 255, 259–265, 268–270, 344, 370/333, 336–338; 709/202, 218, 230, 222, 709/226, 228–229; 712/10–11, 15–16, 25, 712/32, 35, 39, 43, 203, 229

See application file for complete search history.

(56) References Cited

U.S. PATENT DOCUMENTS

| | | | | |
|---|---|---|---|---|
| 5,093,913 A | * | 3/1992 | Bishop et al. | 711/152 |
| 5,996,013 A | * | 11/1999 | Delp et al. | 709/226 |
| 7,107,037 B1 | * | 9/2006 | Talley et al. | 455/400 |
| 2002/0112231 A1 | * | 8/2002 | Lundback et al. | 717/173 |
| 2005/0021619 A1 | * | 1/2005 | Gomes de Oliveira | 709/204 |
| 2005/0107123 A1 | * | 5/2005 | Ishii et al. | 455/560 |
| 2006/0120321 A1 | * | 6/2006 | Gerkis et al. | 370/320 |
| 2006/0171298 A1 | * | 8/2006 | Vu | 370/216 |

\* cited by examiner

*Primary Examiner*—Meless N Zewdu
(74) *Attorney, Agent, or Firm*—Fay Sharpe LLP

(57) ABSTRACT

To provide a system for selecting a processing device that can run an initial service and manages at least one resource, wherein the system allows to increase the extensibility of an initial service, to increase the stability of a running service, and to improve the utilization of the resources provided by several processing devices, it is suggested that, for each initial service two extension services are determined, wherein each extension service defines a set of resources for further extension;

a reservation mode that indicates an extension service is assigned to each processing device that guarantees this extension service to be reserved for the initial service; and a processing device is only selected, if a reservation mode is assigned to it.

16 Claims, 3 Drawing Sheets

METHOD FOR SELECTING A PROCESSING DEVICE

The invention is based on a priority application EP 06290099.8 which is hereby incorporated by reference.

FIELD OF THE INVENTION

The invention relates to a method for selecting a processing device for running an initial service, wherein the processing device provides at least one resource.

BACKGROUND OF THE INVENTION

The invention also relates to a base station that can be connected to a radio network, wherein the base station comprises at least two processing devices and each processing device provides at least one resource that can be requested by an initial service.

Further on, the invention relates to a computer program adapted to be run on a data processing device, in particular on a resource manager or a base station.

A processing device provides different services for data processing. To realize a service, several resources are needed. Typically, different services require a different amount of resources during processing. A resource manager manages these resources. Since the resources of a processing device are limited, a requested service can be rejected, if the appropriate resources are not available.

A processing device can be part of a communications system. A service offered by the processing device typically includes receiving data, for example a data stream, processing the received data, for example by converting the received data to a different data format or finding and removing distorted data within the data stream, and transmitting the data, for example to another processing device, to a user terminal, or to another communications system.

When a service is started, it often is started requiring only few resources. This so-called initial service is for example used to establish a communications link between two terminals, e.g. two mobile telecommunications devices. Frequently, the initial service needs to be extended during processing this service, requiring in general more resources. The amount of resources required by a future extension is not known at the time of starting the initial service. If these resources are not available, this service is stopped, which on the one hand is unpleasant for an user and on the other hand induces a system instability that contradicts to the basic purpose of a service, namely to be reliable.

If a service is requested, often several processing devices are capable of serving the requested service, in principle, which means that one of these processing devices has to be selected. Within the field of communications systems it is known to classify the processing devices according to the amount of one specific resource that is still available or that is already used. The selection of one of the processing devices is then performed according to the amount of available resources, i.e. the processing device that has most of these resource still available is selected.

In an UMTS (Universal Mobile Telecommunications System) the so-called Node B comprises several processing devices and each processing device comprises certain resources. One of these resources is the so-called DL-bit-rate which represents a currently available bit rate for a downlink data stream (DL) of a DSP (Digital Signal Processor) that is part of the processing device. If a new service is requested from the Node B, a processing device is selected according to the available DL-bit-rate of each processing device.

If an initial service is started on a processing device and needs to be extended, the processing device often does not provide the resources needed for service extension due to the fact that too many services are already running on the processing device. Re-allocating the service to another processing device usually is not possible, because this would mean an interruption in processing the data stream.

It is, therefore, an object of the present invention to provide a method for selecting a processing device that increases the extensibility of an initial service and to increase the stability of a running service. It is a further object of the present invention to improve the utilization the resources provided by several processing devices.

The object is solved by a method as mentioned above, wherein for each initial service two extension services are determined, wherein each extension service defines a set of resources for further extension;

a reservation mode that indicates an extension service is assigned to each processing device that guarantees this extension service to be reserved for the initial service; and a processing device is only selected, if a reservation mode is assigned to it.

The inventive method allows to define for each processing device the amount of at least one resource to which an initial service is guaranteed to extend. These extension services are indicated by a reservation mode that is assigned to each processing device that guarantees this extension service, i.e. this set of resources, to be reserved for the initial service.

Defining an extension service can consider several parameters. In particular, an extension service can comprise resources that are required to perform a certain service. If the service, for example, allows the transmission of streaming video, a high downlink (DL) bit rate has to be included into the set of resources. If a processing device is in a reservation mode that indicates this extension service, it is guaranteed that each initial service running on this processing device can be extended such that streaming video can be transmitted.

The inventive method increases the stability of an initial service running on a processing device, since an initial service is only started, if an extension to at least one extension service is guaranteed. The unit that requests this service thus knows which extension service is available.

Advantageously, the two extension services are realized as a maximum extension service and a minimum extension service. The maximum extension service defines the maximum set of resources that are reserved for use by the initial service. The minimum extension service defines the minimum set of resources that are reserved for use by the initial service.

This in particular increases the stability of running services, since an initial service is only started, if the processing device allows at least an extension of the initial service to the minimum extension service. The minimum set of resources that are defined by the minimum extension service can be determined e.g. such that within a communication system at least speech-related data can be transmitted.

The maximum extension service can be defined to define the amount of one or more resources an initial service can at least extend to as long as the processing device is in the maximum reservation mode. The maximum extension service can be determined to realize a trade-off between the number of services that can be served by a processing device or a set of processing devices and the type of service that should be served by the processing device. Within the field of communication systems, the maximum extension service can for example define the resources that are required to process and transmit video streams according to a certain data format and e.g. to a certain sampling rate.

If a processing device guarantees that each initial service served by the processing device can currently extend to the maximum extension service, this processing device is in the maximum reservation mode.

If a processing device guarantees that all initial services served by this processing device can extend to the minimum extension service, this processing device is in the minimum reservation mode.

If a processing device switches from maximum reservation mode to minimum reservation mode each initial service already running will only be guaranteed to extend to the minimum extension service, at least as long as the processing device switches back to the maximum reservation mode.

Since a processing device is only selected when a reservation mode is assigned to it, each processing device that is selected at least is in the minimum reservation mode. This guarantees each initial service to be extended at least to the minimum extension service.

If the initial service does not extend within a predefined time-interval since service start, the reservation for an initial service is cancelled. This prevents resources to get blocked due to being reserved for an initial service but not being used for service extension, at least within the predefined time interval.

According to a preferred embodiment of the present invention, a load is assigned to each processing device. To select a processing device the load of at least one processing device is evaluated. This for example allows to uniformly distribute the initial services to the available processing devices, such that each processing device is similarly loaded.

Preferably, the load of a processing device is determined according to
the resources that are still available,
the resources that are already in use,
the number of services that are already running on the processing device,
the number of services that can still be started according to the current reservation mode, or
a metric taking into account for each resource the part still available or the part already used.

These values are in particular suitable to determine the load of a processing device. If the load is defined by the resources that are still available, it can easily be determined, whether a new initial service can be started on a processing device.

Typically, each initial service running on a processing device has to be managed which induces an overhead. This is one reason why the number of initial services served by a processing device is limited. Knowing the number of services that are already running or the number of services that can still be started thus can advantageously be considered for the selection of a processing device. However, it has to be mentioned that the number of services that can be served by the processing device can itself be viewed as a resource within this context.

Preferably a metric is used to determine the load of a processing device. Any metric appropriately expressing the load and thus the resource consumption and providing the comparability of the processing devices in terms of the load is conceivable in the current context. The metric takes into account for each resource provided by the processing device the part of the resource that is still available or the part of the resource that is already used. Such a metric can additionally assign a weight to each resource such that the part of each resource that is still available or that is already used is considered with a rate according to the weight.

Preferably, if at least one processing device is in the maximum reservation mode, the processing device is selected that has the highest load and is in the maximum reservation mode. This means that among all processors in maximum reservation mode the most loaded processor is selected to start the new service.

Using this selection criteria, the highest loaded processor in maximum reservation mode tends to fill up until entering minimum reservation mode. While new services will be started on the highest loaded processor in maximum reservation mode, other processors in maximum reservation mode tend to get freed by stopped services. Also, processing devices in minimum reservation mode tend to get freed by stopped services. This allows the processing devices in minimum reservation mode to enter the maximum reservation mode, when an extension to the maximum extension service is possible for an initial service. This selection criteria thus allows to run most processing devices in maximum reservation mode.

Preferably, if no processing device is in the maximum reservation mode, but at least one processing device is in the minimum reservation mode, the processing device is selected that has the least load and is in the minimum reservation mode. This means that if no processing device is in the maximum reservation mode, among all processing devices that are in the minimum reservation mode, the least loaded processor is selected to start the new service.

This ensures that all processing devices get evenly filled. When services are stopped, the processing devices enter the maximum reservation mode as soon as an extension to the maximum extension service becomes possible. Given evenly loaded processing devices with similar resource usage and at a similar reservation level, the processing devices enter the maximum reservation mode when the free resources of the processing devices reach the level of the maximum extension service.

According to another advantageous embodiment the processing device in the minimum reservation mode is selected that has the highest load, if no processing device is in a maximum reservation mode, but at least one processing device is in the minimum reservation mode. This selection of the maximum instead of the least loaded processing device in minimum reservation mode leads to an earlier transition from minimum to maximum reservation mode, since the probability that a single processing device reaches the maximum reservation mode is higher. Using this selection criteria the initial services allocated have a higher risk to not be extendable to the maximum extension service.

If none of the processing devices is in the maximum reservation mode and none of the processing devices is in the minimum reservation mode, no processor is selected at all and the requested service is rejected. So the likelihood is reduced that an initial service can not be extended due to the fact that the required resources are not available. Instead, an initial service is only started, if at least an extension to the minimum extension service is guaranteed.

According to the inventive method it is advantageously possible to define the maximum reservation mode or the minimum reservation mode such that only few, but large services can be served or such that a large number of small services can be served. Therefore, the set of resources that are defined by the minimum extension service and the maximum extension service can be chosen, accordingly.

According to another preferred embodiment of the present invention, the processing device is part of a base station, wherein the base station can be connected to a radio network. According to the UMTS-standard, the radio network can be realized as the UTRAN (UMTS Terrestrial Radio Access Network) and the base station can be realized as a Node B.

The object is also solved by a base station that can be connected to a radio network, wherein the base station comprises at least two processing devices and each processing device provides at least one resource that can be requested by an initial service, wherein the base station is adapted to execute the inventive method.

The object is also solved by a computer program adapted to run on a data processing unit, in particular on a base station or a resource manager, wherein the computer program is programmed to execute the inventive method, if the computer program is run on the data processing unit, wherein the data processing unit comprises at least two processing devices.

The realization of this invention in the form of the computer program is particularly important. Parts of the computer program may be run on different processing units or on different computers in order to carry out the inventive method. The invention is, thereby, realized by the computer program, wherein this computer program represents the invention in the same sense as the method for the execution of which the computer program is suitable. The computer program is preferably stored in a storage element. A storage element may in particular be a random-access-memory (RAM), a read-only-memory (ROM), a hard disc, or an optical storage medium like a compact disc (CD) or a digital versatile disc (DVD).

Further features, applications and advantages of the invention will become apparent from the following description of exemplary embodiments of the invention that are shown in the drawings. There, all described and shown features separately or in any combination represent the subject-matter of the invention, independently of the wording in the description or the representation in the drawings and independently of a combination in the claims or the dependencies of the claims.

DETAILED DESCRIPTION OF THE INVENTION

Figure 1:
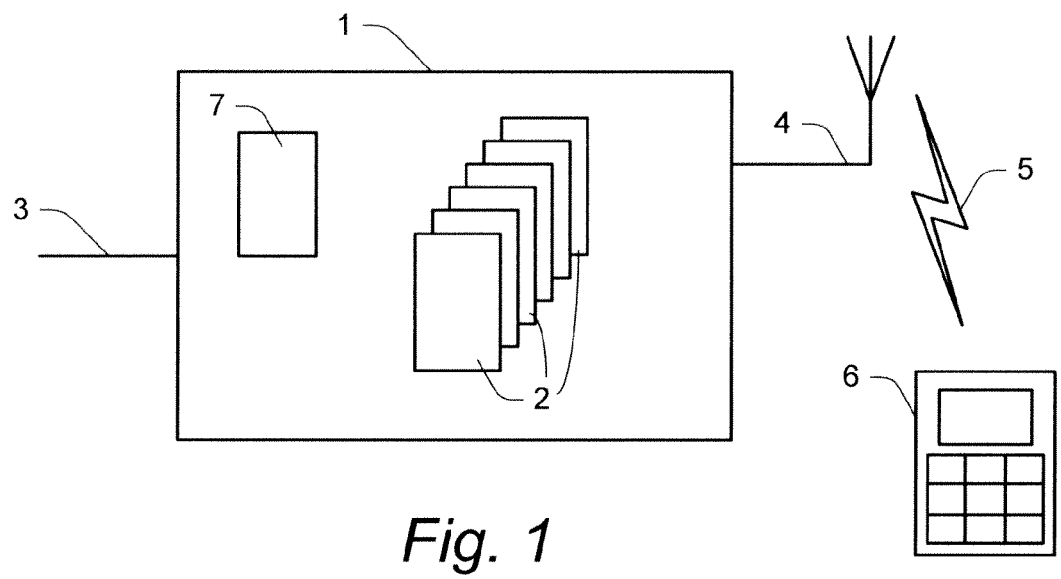
FIG. 1 shows a schematised data processing unit on which the inventive method can be executed.

FIG. 1 shows a data processing unit 1, for example a base station within a communications system, that comprises several processing devices 2. The processing unit 1 is linked to the communications system by a link 3 and an antenna 4. The processing unit 1 is embodied to transmit data via a radio link 5 to a user terminal 6, for example a mobile telecommunications device. The data processing unit 1 also comprises a resource manager 7. The resource manager 7 could also be implemented in hardware within the data processing unit 1. However, the resource manager 7 could also be part of a processing device 2, wherein the resource manager could be realised in software running on a specific processing device 2. When a service is requested from the data processing unit 1, the resource manager 7 selects one of the processing devices 2 on which the initial service is to be started or rejects the request.

If a first user terminal (not shown in FIG. 1) wants to establish a connection to the user terminal 6, a service request is sent from the first user terminal via the link 3 to the processing unit 1. In the processing unit 1 a processing device 2 is selected to serve the requested service. If a processing device 2 is selected, the requested service is started as an initial service.

According to the present invention the processing device 2 that is selected to serve the initial service guarantees that the initial service can be extended, at least to a predefined minimum extension service. Such a processing device 2 operates in the minimum reservation mode.

If one or several processing devices 2 are in the maximum reservation mode, one of these processing devices 2 will be selected such that an extension to the maximum extension service is guaranteed, at least as long as the processing device 2 is in the maximum reservation mode. If the processing device 2 switches from the maximum reservation mode to the minimum reservation mode, an extension only to the minimum extension service will be guaranteed to all running initial services. Among the processing devices 2 in the maximum reservation mode, the requested service will be run on the processing device 2 that has the highest load.

If no processing device is in the maximum reservation mode and no processing device 2 is in the minimum reservation mode, the requested service is rejected.

The load of each processing device 2 can be determined according to a metric that takes one or several resources provided by the processing device 2 into account.

Figure 2:
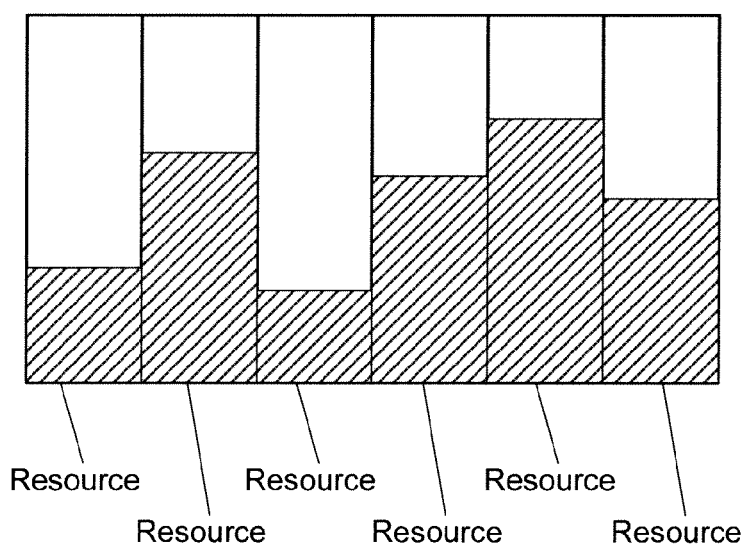
FIG. 2 shows a simplified diagram of the used resources of a processing device.

FIG. 2 shows a simplified diagram of the resources that are available for use by a given processing device 2 for processing running services at a given time. It is conceivable, that the resources used by a processing device 2 are determined at predefined time intervals. Each bar in the bar graph shown in FIG. 2 represents a resource. The hatched part represents the part of the resource that is reserved such that each service can be extended according to the current mode of the processing device 2. E.g., if the processing device 2 is currently in the maximum reservation mode, the hatched parts of the bars represent the amount of each resource that would be in use, if each currently running service would be extended to the maximum reservation mode. However, if the processing device 2 is currently in the minimum reservation mode, the hatched parts of the bars represent the amount of each resource that would be in use, if each currently running service would be extended to the minimum reservation mode.

If the processing unit 1 is a base station, the resources could be an uplink (UL) credit, a downlink (DL) credit, a UL bit rate, a DL bit rate, a number of twin spreaders, a digital signal processing (DSP) load, or a number of user terminals or user equipments maintained by the processing device 2.

According to this example, for each processing device 2 a credit is defined for uplink and downlink, wherein each credit represents the current estimated processing power of the processing device 2. A twin spreader describes the processing resource that enables to perform the spreading and scrambling of a transmission channel for one or two transmit antennas 4 in case that transmit diversity is activated. A DSP load is used for overload protection and should guarantee that the load is under a predefined threshold.

Figure 3A:
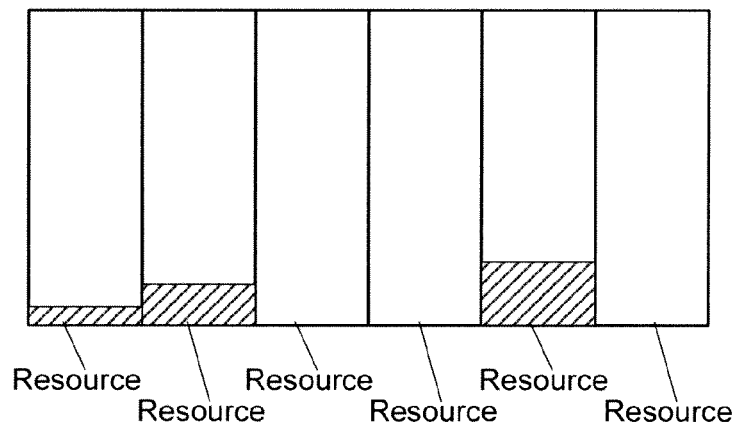
FIG. 3a shows a simplified example of the resource usage of an initial service.

FIG. 3a shows a bar graph that represents exemplified the resources required from an initial service. Again, each bar represents a resource, wherein the hatched part of this bar represents the amount of this resource that is used to start and process the initial service. In the example shown in FIG. 3a, only three resources of the six resources are needed to start the initial service. This is only an exemplified assumption, since in practice, often all or nearly all kind of resources are used for the initial service, at least at a very small amount.

Figure 3B:
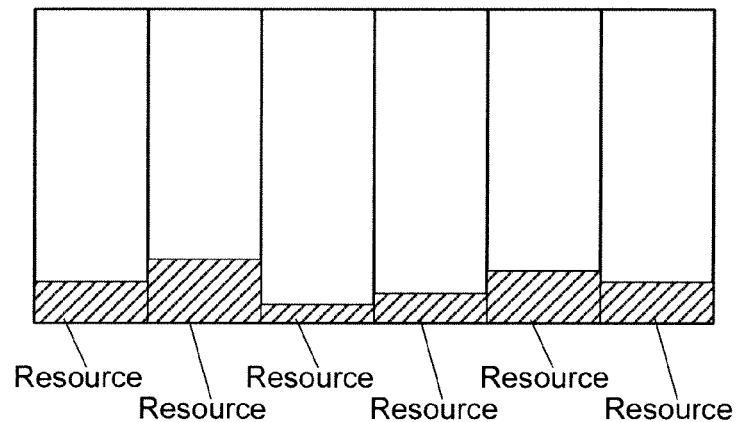
FIG. 3b shows a simplified diagram of the resource usage of a minimum extension service.
Figure 3C:
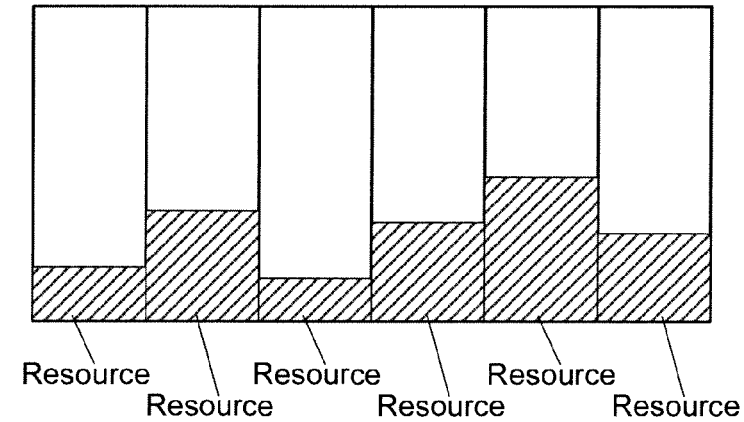
FIG. 3c shows a simplified diagram of the resource usage of a maximum extension service and FIG. 4 shows a flow diagram of an embodiment of the invention.

FIG. 3b shows in a bar graph the amount of resources that are required to serve a certain minimum extension service. FIG. 3c shows the resources that are required to serve a maximum extension service. Again, the hatched parts of each bar shows the amount of resources that are required to serve the appropriate service.

It is obvious that a processing device 2 can only start an initial service 3a, if the hatched bars of the processing device at this time can be increased by the amount of the hatched bars of the initial service 3a without exceeding the limits as shown in FIG. 2. Correspondingly, a minimum extension service 3b and a maximum extension service 3c can only be served by the processing device 2, if the hatched bars can be extended by the amount of the appropriate resource without exceeding the given limit.

According to the present invention, an initial service is only started, if a minimum extension service can be served by the processing device 2. This means, that for each new initial service it is not only determined whether the resources needed from the initial service are available from the processing device 2, but it is also determined whether the resources required for an extension of the initial service to the minimum extension service are available at the processing device 2. If the resources required for the initial service are available, but the resources required for the minimum extension service are not available, the initial service is rejected. This means, in other words, that an initial service is only started on the processing device 2, if it is guaranteed that the initial service can be extended to the minimum extension service. This means in turn that an initial service is only started, if the processing device 2 is at least in the minimum reservation mode.

According to the example shown in FIGS. 2 and 3a to 3c, the initial service as shown in FIG. 3a could be started on the processing device 2 loaded as shown in FIG. 2, since at least an extension to the minimum extension service, as shown in FIG. 3b, can be guaranteed by the processing device 2.

An extension of the initial service to the maximum extension service, as is defined by a resource reservation shown in FIG. 3c, could not be guaranteed by the processing device 2, since the amount of the resource represented by the fifth bar in FIG. 3c and used to guarantee an extension to the maximum extension service would not fit into the unhatched part of the corresponding resource in FIG. 2 that represents the part that is still available. From this it can be concluded, that the processing device 2 is in the minimum reservation mode, assuming, that the processing device is loaded as shown in FIG. 2, the minimum extension service is defined as shown in FIG. 3b and the maximum extension service is defined as shown in FIG. 3c. This means, that a processing device 2 in the maximum reservation mode only guarantees an extension to the maximum extension service, at least as long as the processing device 2 is in the maximum reservation mode.

Figure 4:
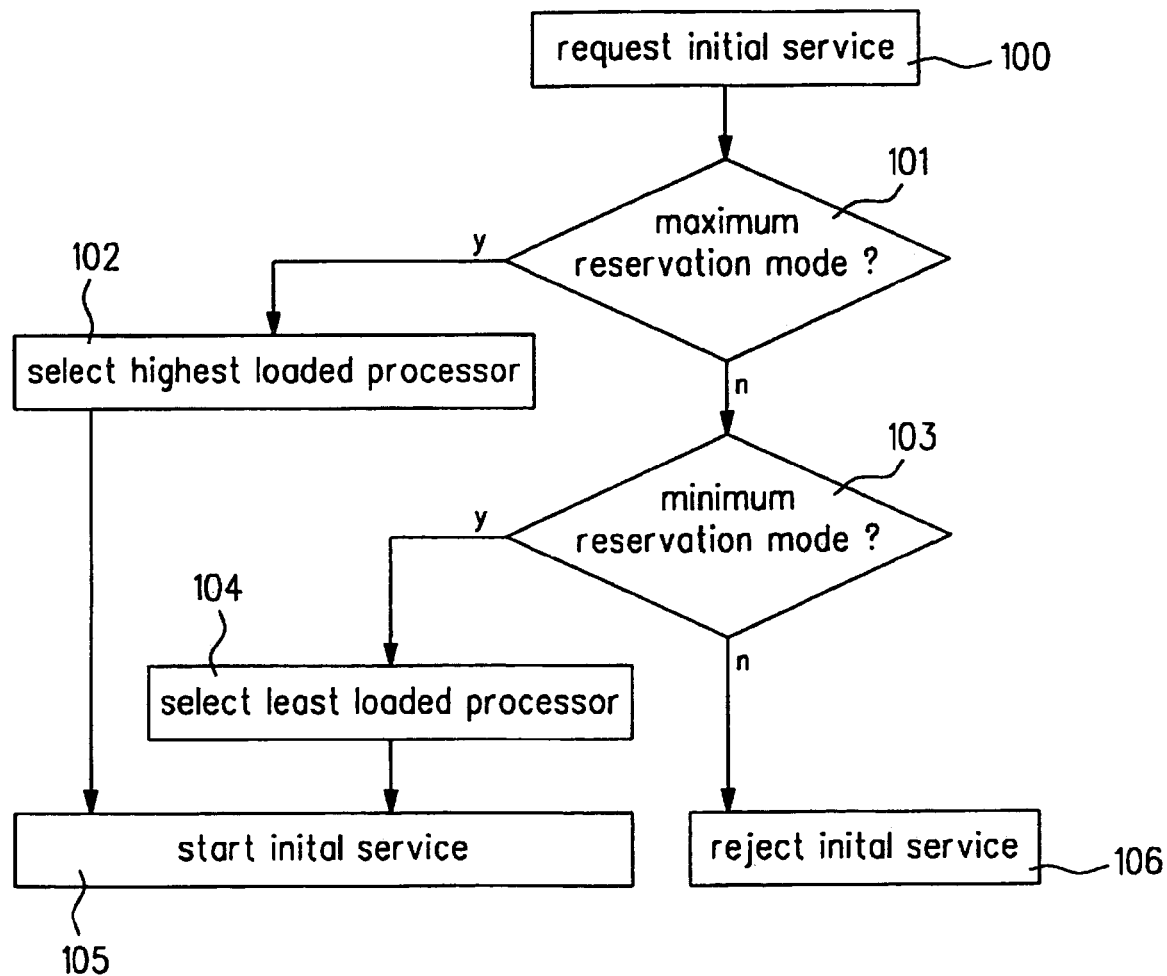

FIG. 4 shows a flow diagram of an embodiment of a method according to the present invention.

The method starts in a step 100, where an initial service is requested.

In a step 101 it is determined, whether any processing device 2 is in the maximum reservation mode. If this is the case, the method branches to a step 102 where the highest loaded processing device 2 that is in the maximum reservation mode is identified and selected. According to the example of the load of a processing device 2 as shown in FIG. 2, a metric could be induced to define the load of each processing device 2 in such a way, that the loads of two or more processing devices 2 could be compared and the highest loaded processor could be determined. Mathematically speaking, the metric induced must be capable of defining an order to each processing device 2 in the set of processing devices 2 that are in the maximum reservation mode. Such a metric could e.g. define the load as a percentage value, wherein the load is determined as the average value of the load of each resource, may be by first defining a weight to each resource and multiplying the load of each resource by the weight. Various further and higher sophisticated metrics are conceivable to one skilled in the art. These metrics could in particular include characteristics that define the importance of one or more resources according to the scope of application.

In a step 105 the initial service is started on the processing device 2 that was selected in step 102.

If in the step 101 no processing device 2 is determined that is in the maximum reservation mode, the method branches to a step 103. In the step 103 it is checked, whether any of the processing devices 2 is in the minimum reservation mode. If this is the case, the least loaded processing device 2 that is in the minimum reservation mode is selected in a step 104. Again, a metric as described above can be used to determine and compare the load of the processing devices 2 within the set of the least loaded processing devices 2. Having selected the least loaded processing device 2, the initial service is started in step 105 on the selected processing device 2.

If in step 103 no processing device 2 is determined that is in the minimum reservation mode, the method branches to step 106, where the initial service is rejected. This means in particular, that the request of an initial service is rejected, if an extension at least to the minimal extension service could not be guaranteed, even if at least one processing device 2 would provide enough resource to serve the initial service itself.

Further embodiments of the inventive method are conceivable. For example it is conceivable that in the step 104 the highest loaded processing device that is in the minimum reservation mode is selected. It is further conceivable, that in the step 102 the least loaded processing device in the maximum reservation mode is selected.

The invention claimed is:

1. Method for selecting one of a plurality of processing devices for running an initial service, wherein the processing device manages at least one resource, the method comprising:

identifying two extension services for each initial service, wherein each extension service defines a set of resources for further extension;

indicating, via a reservation mode, that an extension service is assigned to each of the plurality of processing devices that guarantees the extension service to be reserved for the initial service;

selecting the processing device from the plurality of processing devices to run the initial service once a reservation mode is assigned to it; and cancelling a reservation of the extension service for the initial service when the initial service has not extended within a predefined time-interval since the initial service started;

wherein the method is executed by a base station connected to a radio network.

2. Method of claim 1, wherein the two extension services are realized as a maximum extension service defining a maximum set of resources that are reserved for use by the initial service and a minimum extension service defining a minimum set of resources that are reserved for use by the initial service.

3. The method of claim 2, wherein the processing device is in a maximum reservation mode whenever each initial service is guaranteed to extend to the maximum extension service, the processing device is in a minimum reservation mode whenever each initial service is guaranteed to extend to the minimum extension service, and that when the processing device switches from the maximum reservation mode to the minimum reservation mode each initial service already running will only be guaranteed to extend to the minimum extension service, at least as long as the processing device switches back to the maximum reservation mode.

4. The method according to claim 2, wherein when no processing device is in a maximum reservation mode but at least one processing device is in a minimum reservation mode, the processing device is selected that has the highest load and is in the minimum reservation mode.

5. The method according to claim 2, wherein the maximum reservation mode or the minimum reservation mode is defined according to whether only few but large services should be provided or whether a large number of small services should be provided.

6. The method of claim 1, wherein each service running on the processing device can be reconfigured such that previously used resources are freed.

7. Method of claim 1, wherein a load is assigned to each processing device, the load of at least one processing device is evaluated, and the processing device is selected depending on the result of the evaluation.

8. The method according to claim 1, wherein a load of the processing device is determined according to resources that are still available, resources that are already in use, number of services that are already running on the processing device, number of services that can still be started according to the current reservation mode, or a metric taking into account, for each resource in the set of resources, a part still available or a part already used.

9. The method according to claim 1, wherein when at least one processing device is in the maximum reservation mode, the processing device is selected that has the highest load and is in the maximum reservation mode.

10. The method according to claim 1, wherein when no processing device is in a maximum reservation mode but at least one processing device is in a minimum reservation mode, the processing device is selected that has the least load and is in the minimum reservation mode.

11. The method according to claim 1, wherein when no processing device is in a maximum reservation mode and no processing device is in a minimum reservation mode no processing device is selected.

12. The method according to claim 1, wherein the processing device is part of the base station.

13. The method of claim 12, wherein the radio network is a Universal Mobile Telecommunications System (UMTS) Terrestrial Radio Access Network (UTRAN) and the base station is a Node B.

14. The method of claim 1, wherein the base station comprises at least two processing devices and each processing device provides at least one resource that can be requested by an initial service, characterized in that the base station is adapted to execute a method according to claim 1.

15. A storage medium that stores a computer readable program that is run on a data processing unit, in particular on a base station, wherein the computer readable program is programmed to execute a method according to claim 1, when the computer program is run on the data processing unit.

16. The computer readable program of claim 15, wherein the storage device is one of a random access memory, a read only memory, a flash memory, compact disc, a digital versatile disc or a hard disc.

* * * * *